Figure 1:
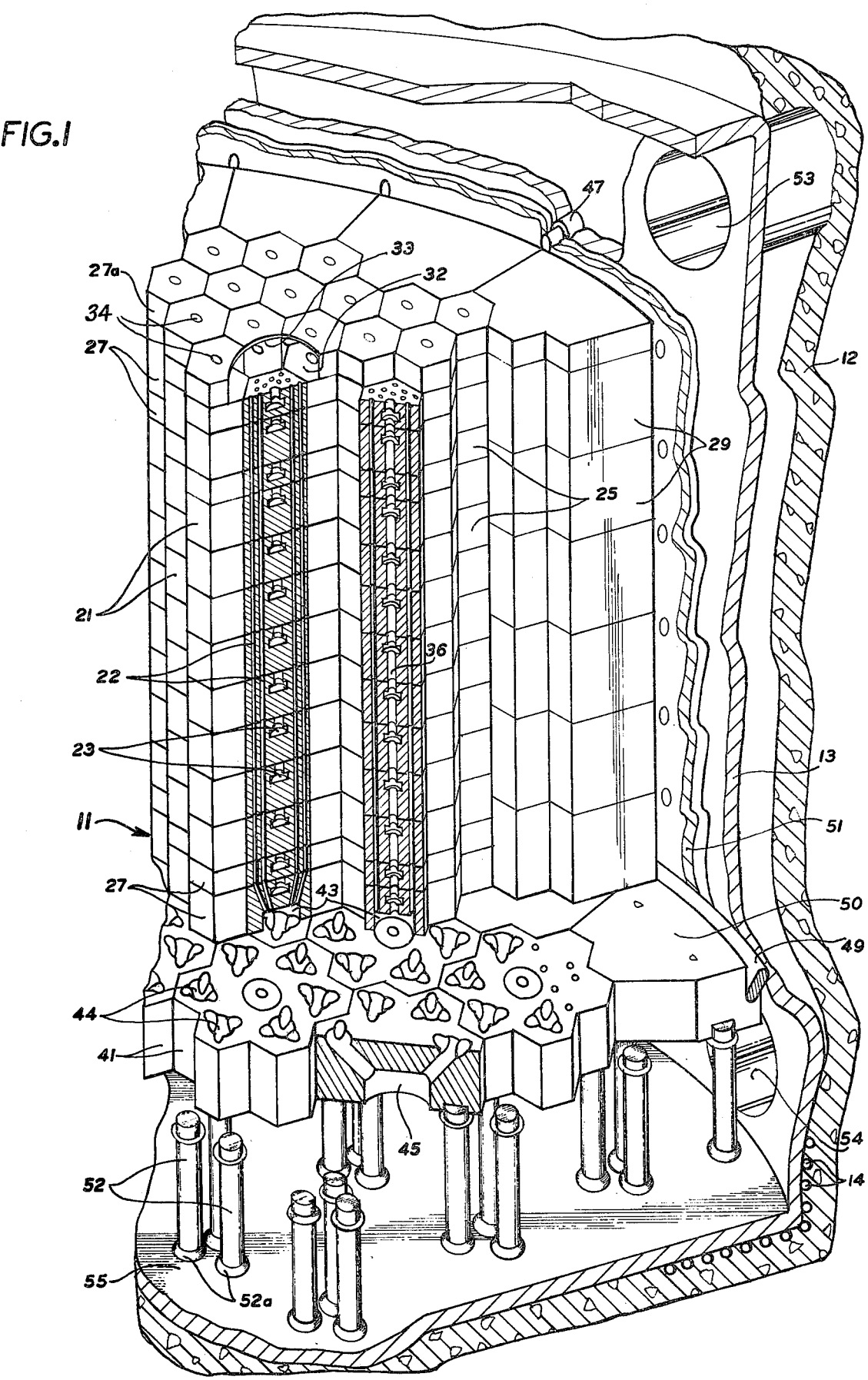

United States Patent [19]

Anderson

[11] 4,086,133

[45] Apr. 25, 1978

[54] NUCLEAR REACTOR CORE REFUELING METHOD

[75] Inventor: Paul Michael Anderson, San Diego, Calif.

[73] Assignee: General Atomic Company, San Diego, Calif.

[21] Appl. No.: 720,746

[22] Filed: Sep. 7, 1976

[51] Int. Cl.² .................. G21C 19/20; G21C 3/30; B66C 17/08
[52] U.S. Cl. .................................... 176/30; 176/77; 176/94; 214/18 N
[58] Field of Search ............................ 176/30, 77, 94; 214/18 N

[56] References Cited

U.S. PATENT DOCUMENTS

| 3,383,286 | 5/1968 | Paget ................................ 176/30 |
| 3,676,297 | 7/1972 | Rennie ............................. 176/77 |
| 3,711,369 | 1/1973 | Pugh ................................ 176/30 |

FOREIGN PATENT DOCUMENTS

| 923,633 | 4/1963 | United Kingdom ................ 176/30 |
| 952,558 | 3/1964 | United Kingdom ................ 176/30 |
| 1,126,322 | 9/1968 | United Kingdom ................ 176/30 |
| 1,246,760 | 9/1971 | United Kingdom ................ 176/30 |

OTHER PUBLICATIONS

Motoda, "Nuclear Science & Engineering", Technical Notes, 49, 515-524 (1972).

Primary Examiner—Stephen C. Bentley
Assistant Examiner—Donald P. Walsh
Attorney, Agent, or Firm—Fitch, Even, Tabin & Luedeka

[57] ABSTRACT

A method for refueling a nuclear reactor core inside a pressure vessel is described. The method is used with a core which has at least one region comprised of a plurality of layers, each layer being comprised of a plurality of individual fuel elements with the corresponding fuel elements in respective layers forming columns extending transversely of the layers. Unspent fuel elements are first removed from the pressure vessel to expose at least one but not all of the spent fuel elements. The exposed spent fuel elements are then removed and the unspent elements are shuffled within the reactor core without being removed therefrom to expose additional spent fuel elements. These are removed and the shuffling process is repeated until all of the spent fuel elements have been removed. The initially removed unspent elements are then returned to the pressure vessel and placed in the core. New unspent fuel elements are then placed in the pressure vessel to complete the core.

9 Claims, 9 Drawing Figures

NUCLEAR REACTOR CORE REFUELING METHOD

This invention relates generally to nuclear reactors and, more particularly, to an improved method for refueling a nuclear reactor core of a particular type.

Many types of nuclear reactors comprise a plurality of removable core elements forming a core. Such core elements may be comprised of fissile or fertile material, neutron moderating material, neutron reflecting material, or combinations of some or all of these. Before starting reactor operation, the core is usually formed of the core elements and, after certain periods of operation, the core is usually refueled by replacing some or all of the core elements containing fissile material. Periodic replacement of core elements containing fertile, moderating or reflecting material may also be necessary.

Frequently, some type of reactor vessel is provided for enclosing the core to contain radioactive products in the event of an accident and, if desired, to also provide a biological shield of personnel working about the reactor. A reactor vessel may also be constructed to contain a liquid or gas coolant for the core.

When the reactor vessel is so designed as to completely enclose the core, a suitable penetration may be provided in the reactor vessel in order that the core elements can be placed in and removed from the reactor vessel. The provision of one or more penetrations for core element handling, in addition to other penetrations in the reactor vessel for such things as instrumentation and control rods, may result in so many penetrations as to make it difficult or expensive to secure proper integrity for the reactor vessel. The use of some penetrations for more than one purpose, such as utilizing the control rod penetrations for refueling, is therefore desirable.

One advantageous form of core construction, for certain applications, is that in which core elements are in block form and the core is comprised of a plurality of adjacent columns of such blocks. Typically, the core, for refueling purposes, is considered as being divided into a plurality of regions of columns of blocks, each region being serviced through one of the control rod penetrations during the refueling operations. For the purposes of reactivity control, coolant flow control and refueling, a particularly advantageous number of columns in each region is seven, in which case a central column is employed surrounded by six peripheral columns. A core construction of this general type is shown and described in U.S. Pat. No. 3,383,286, issued May 14, 1968, and assigned to the United States of America.

A desirable refueling technique for the foregoing described type of reactor core is to place fresh fuel elements at the top of the reactive core while removing spent fuel elements from the bottom of the reactive core. Techniques heretofore employed for refueling this type of core configuration have involved the temporary placement of all reflector and fuel elements in the layers above the spent fuel elements into temporary storage in a fuel handling machine. The spent fuel elements are then removed from the core and transferred by suitable means to a fuel storage area. The unspent elements previously removed are then replaced in the core but at elevations which are below their previous elevation by an amount corresponding to the number of layers of spent fuel elements previously removed. The core is then completed in the active region by placing fresh unspent fuel elements in the top layer or layers and then replacing the reflector elements.

The foregoing described refueling technique requires sufficient storage in the temporary storage region of the fuel handling machine to accommodate all of the upper reflector elements and the unspent fuel elements which are to be returned to the core. Moreover, the foregoing described technique requires removal from the pressure vessel of all of the unspent fuel elements and their subsequent return thereto during the refueling process. Because refueling operations involve a considerable amount of time, it is desirable that the number of required operations be reduced as much as possible.

It is an object of the present invention to provide an improved method for refueling a nuclear reactor core.

Another object of the invention is to provide a method for refueling a nuclear reactor core of the type which employs a plurality of columns of fuel elements, which techinque provides a substantial reduction in the refueling time as compared with previously known techniques.

A further object of the invention is to provide an improved method for refueling a nuclear reactor core of the type employing a plurality of columns of nuclear fuel elements, which method involves fewer out of core operations and smaller temporary storage space.

Other objects of the invention will become apparent to those skilled in the art from the following description, taken in connection with the accompanying drawings wherein:

FIG. 1 is a partial schematic perspective view illustrating a portion of a reactor core and pressure vessel of the type is which the method of the invention is employed; and FIGS. 2 through 9 are schematic composite illustrations of successive steps in a preferred form of the method of the invention.

Very generally, the method of the invention is used in connection with a nuclear reactor core inside a reactor vessel. The core has at least one region comprised of a plurality of layers, each layer being comprised of a plurality of individual fuel elements with the corresponding fuel elements in respective layers forming columns extending transversely of the layers. The method comprises removing from the pressure vessel unspent fuel elements to expose at least one but not all of the spent fuel elements. These exposed spent fuel elements are then removed from the pressure vessel. Unspent fuel elements remaining within the pressure vessel are then moved to other core locations including the former locations of the previously removed spent fuel elements. The movement of the unspent fuel elements also exposes additional spent fuel elements. These exposed additional spent fuel elements are then removed from the pressure vessel and unspent fuel elements which were previously removed from the pressure vessel are then placed within the pressure vessel at other locations in the core. New unspent fuel elements are then placed within the pressure vessel to complete the core.

Referring now more particularly to the drawings, the specific constructions of the core and some of its associated structure may be more clearly seen. The core 11 is enclosed in a reactor vessel 12 of concrete or other suitable material. The inside of the reactor vessel 12 is provided with a metal liner 13 which is cooled by coolant circulated in ducts 14.

The general shape of the core is that of right circular cylinder having a diameter which is slightly greater than its height. The core is made up of a plurality of columns of separate fuel blocks 21 of hexagonal cross section arranged on a uniform triangular pitch. The fuel blocks are preferably of extruded graphite construction in which a plurality of rods (not shown) of fissionable material are imbedded. Each of the fuel blocks is provided with a plurality of openings which align to form the vertical passages 22 therein. The passages 22 extend completely through the fuel blocks and are located in the same position in each of the fuel blocks. Thus, the vertical passages extend completely through the length of each of the columns of fuel blocks. These vertical passages are utilized to pass coolant gas through the reactor core.

The fuel blocks 21 of the core contain vertical holes 23 therein in addition to the vertical passages 22. The holes 23 extend through only part of the length of each block in these columns and permit handling equipment, not shown, to be lowered into the block for raising and lowering same during fueling and refueling. Alignment of the passages 22 may be maintained by a plurality of graphite dowel pins (not shown) extending from the top face of each fuel block. The dowel pins on each fuel block fit into mating holes in the bottom of the block immediately above.

The core also includes a reflector. The reflector consists of an outer wall of graphite blocks 25 identical in shape to the fuel blocks 21. Additional reflector blocks 27 are disposed in the same columnar arrangement as the fuel blocks, forming continuations of the fuel block columns in three layers above and two layers below. The reflector blocks include passages forming continuations of the passages 22 in the fuel blocks.

The radially outer portion of the reflector consists of a plurality of graphite reflector blocks 29, also arranged in columns. The reflector blocks 29 are substantially larger than the reflector blocks 25 and are shaped with two opposite angularly diverging sides, an arcuate side and an irregularly shaped side opposite the arcuate side. The irregular side of each reflector block 29 forms a mating engagement with adjacent columns of the reflector blocks 25, and the arcuate side forms part of an exterior cylindrical surface. The reflector configuration, of course, may be different from that shown, but the foregoing described configuration has been found satisfactory.

The reflector blocks (or caps) 27a in the top layer are partially hollow and form a hollow space or plenum 32 above the upper ends of the coolant passages 22 for the fuel block columns. A circular opening 33 communicates with the plenum 32. An orificing apparatus, not shown, is placed over the openings 33 to control the flow rate of coolant gas to the plenum 32 over each fuel region. The outer columns of reflector elements 29 are not hollow but extend as solid blocks all the way to the top.

Each of the blocks 27 and 27a is provided with a central opening 34 therein to facilitate reception of a pickup tool, not shown, for removing the capped reflector blocks during refueling. The other blocks 21 also have openings 23 therein shaped to be engaged by the unillustrated pickup tool. In some of the block columns, suitably spaced, the openings 23 extend all the way through the blocks to form a control rod passage as shown at 36.

The columns of fuel blocks and reflector blocks rest upon a layer of large graphite core support blocks 41. As shown in the drawings, each support block 41 supports the seven columns of fuel and reflector blocks in a respective core region. The columns of fuel and reflector blocks are positioned on the support blocks 41 by a plurality of graphite dowels (not shown) which provide lateral restraint and column alignment at the bottom of the core.

As may be seen from FIG. 1, the lowermost layer of reflector blocks 27 is designed such that the coolant passages 22 in each block converge into a collection chamber or discharge orifice 43 formed in each block. Each of the support blocks 41 has a plurality of intake ducts or passages 44, each passage communicating with a respective one of the chambers 43. The intake passages 44 converge to outlet or discharge orifice 45 on the lower side of the block.

The layer of core support blocks 41 is radially surrounded and continued by a plurality of larger core support blocks 50. The core support blocks 50 are shaped to mate with the blocks 41 and to form a cylindrical outer surface. The blocks 50 support the side columns of reflector blocks 25 and 29. A double-walled cylindrical metal shroud 51 surrounds the core and is spaced from the liner 13 by stud supports 47. A bypass gas shield 49 is positioned between the blocks 50 and the shroud 51.

The graphite core support blocks 41 and 50 are supported from a core support floor 55 by a plurality of vertical graphite posts 52. The graphite posts have spherical ends which seat in concave seats 52a to permit the posts to rock slightly to accommodate differential expansion between the parts of the structure.

Coolant gas collected from the inlet ducts 53 in the space above the top of the reactor core and its surrounding reflector passes into the plenums formed by the caps 27a. The gas then enters the passages 22 flowing therethrough and into the chambers 43. As the gas flows through the passages 22, it is heated by the reactor core due to the heat generated by the fission chain reaction in the core. The hot gas is collected in the chambers 43 and then passes through the support blocks 41, through the passages 44 therein, and is discharged from the orifices 45 into the space below the lower support blocks 41. From there, the coolant gas passes through suitable ducts 54 to steam generators or turbines, also not shown.

In refueling the illustrated reactor, an entire core region of seven columns is refueled before refueling another region. A suitable refueling mechanism, not shown, extends into the reactor vessel through the unillustrated control rod penetration above each region. In the illustrated embodiment, each of the columns of elements is comprised of two bottom layers of reflector elements, eight layers of fuel elements, and three top layers of reflector elements. This may be more easily seen in the schematic drawings of FIGS. 2 through 9. A numbering system has been employed for the element locations in FIGS. 2 through 9 as shown and subsequently described. The number preceding the decimal denotes the layer location, top to bottom. The number following the decimal indicates column location in a particular fuel region, i.e. 1–7.

In practicing the method of the invention in connection with the reactor core schematically illustrated in FIGS. 2 through 9, the first step is to remove from the reactor pressure vessel all of the reflector elements in the top three layers of the fuel region and column 1, elevations 4 through 9. This would correspond to levels 1, 2 and 3 of FIG. 2, namely elements 01.01-03.07, and 04.01-09.01. These are placed in temporary storage, such as within a fuel handling machine.

Figure 3:
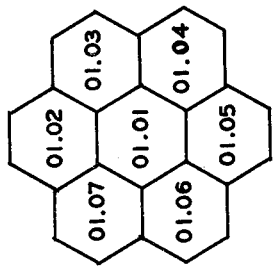
Figure 2:
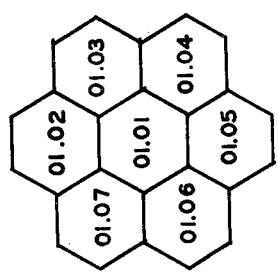

The next step in the preferred embodiment of the invention is illustrated in FIG. 3 wherein the fuel elements at elevations 4 through 9 in column 2, elevations 4 through 7 in column 3 and elevations 4 and 5 in column 4 are removed from the pressure vessel. These elements are 04.02-04.04, 05.02-05.04, 06.02-06.03, 07.02-07.03, 08.02 and 09.02. These fuel elements are all placed in temporary storage, such as within a fuel handling machine. The resulting configuration is shown schematically in FIG. 3 with the shaded elements being those elements for which temporary storage is required. In the illustrated embodiment, this number is a total of thirty-nine elements. It should be noted that at the completion of this step, some but not all of the spent fuel elements in the lowermost two layers are exposed. These spent fuel elements are those in columns 1 and 2. The spent fuel elements in the lower two layers in columns 3 through 7 are not exposed.

The spent fuel elements, 10.01, 10.02, 11.01 and 11.02, in the lowermost two fuel levels of columns 1 and 2 are then removed and placed in a suitable transfer mechanism for transport to a fuel storage area. The resulting core configuration is as illustrated schematically in FIG. 4.

Figure 5:
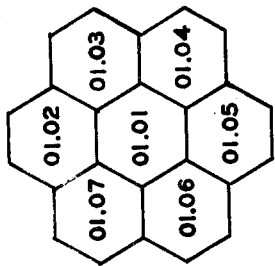

After removal of the exposed spent fuel elements previously described, the refueling method continues by moving fuel elements within the pressure vessel directly from one location to another location within the core. As shown in FIG. 5, one form which the method of the invention may take is to move element 8.03 to location 11.02, element 9.03 to location 10.02, element 6.04 to location 9.02, element 7.04 to location 8.02, element 4.05 to location 7.02, and element 5.05 to location 6.02. This is illustrated in FIG. 5 and the result is that spent fuel elements 10.03 and 11.03 are exposed. These may now be removed from the core and the pressure vessel and placed in a suitable transfer means for removal to a spent fuel element storage area. The resulting core configuration is now illustrated schematically in FIG. 6.

Figure 4:
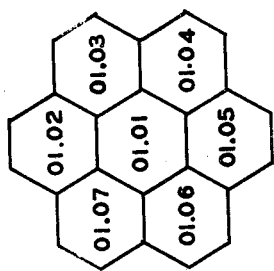
Figures 6, 7:
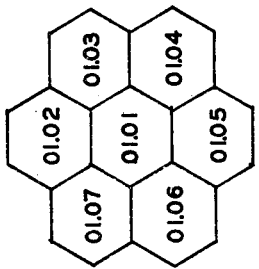

By comparing FIGS. 4 and 6, the last eight element movements above described have created a new column No. 2 with elements that have moved on the average of two elevations lower than their previous locations. The result of the steps leading to the configuration of FIG. 6 is that a stair step configuration for the core exists which is similar to that shown in FIG. 4. This allows for proceeding in a similar manner with internal transfer of other fuel elements to expose additional spent fuel elements for removal. Such a procedure is shown in FIG. 7 wherein six additional in-core transfers have been accomplished as well as two removals of spent fuel elements. To achieve the configuration of FIG. 7, the element of 08.04 is moved to 11.03, 09.04 to 10.03, 06.05 to 09.03, 07.05 to 08.03, 04.06 to 07.03, and 05.06 to 06.03. The spent fuel elements at 10.04 and 11.04 may then be moved to storage.

Figure 8:
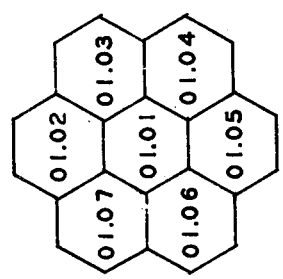

Referring to FIG. 8, the schematic illustration therein indicates the condition of the core after ten additional element relocations and six removals of spent fuel elements from the condition illustrated in FIG. 7. This proceeds as follows: 08.05 to 11.04, 09.05 to 10.04, 06.06 to 09.04, 07.06 to 08.04, 04.07 to 07.04, 05.07 to 06.04, 10.05 and 11.05 to storage, 08.06 to 11.05, 09.06 to 10.05, 06.07 to 09.05, 07.07 to 08.05, 10.06 and 11.06 to storage, 08.07 to 11.06, 09.07 to 10.06, and 10.07 and 11.07 to storage.

Figure 9:
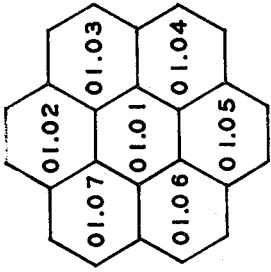

In the condition illustrated in FIG. 8, all of the spent fuel elements in the lower two layers have been removed and the pressure vessel shuffling of the unspent fuel elements is completed. The eighteen unspent fuel elements previously removed to temporary storage are then returned to the interior of the pressure vessel and placed into the core in the locations 7.05, 6.05, 9.06, 8.06, 7.06, 6.06, 11.07, 10.07, 9.07, 8.07, 7.07, 6.07, 11.01, 10.01, 9.01, 8.01, 7.01 and 6.01. The resulting configuration is shown in FIG. 9 wherein the core is complete except for the top two layers of fuel element and the top three layers of the reflector elements. Fourteen fresh fuel elements are then brought into the pressure vessel by the unillustrated fuel handling means and placed in the upper two elevations or levels for the fuel elements. The previously withdrawn twenty-one reflector elements are then replaced within the pressure vessel in the top three levels of the core. The complete fuel handling for this particular region is then completed.

It should be noted that the term "spent" as used in relation to fuel elements is intended to refer to the replacement time for the fuel element in the designed fuel cycle for the particular reactor. Thus, the term is used not necessarily in the sense of the amount a particular fuel element has decayed, but rather as a design criterion. Typically, the fuel elements in the described reactor are changed every four years. Layer 12 of the bottom reflectors and layer 3 of the top reflectors are replaced, typically, every twelve years by removal when exposed.

The method of the invention allows for smaller temporary storage space requirements within fuel handling apparatus and also reduces the total number of handling operations for refueling the core. Temporary storage requirements are reduced roughly 30% or more from that of known prior art techniques. Moreover, the number of out of core handling operations required is reduced by approximately the same amount. The invention therefore provides an improved method for refueling a reactor core of the described type which represents a significant reduction in the refueling time and in the temporary storage space requirements.

Various modifications of the invention in addition to those shown and described herein will become apparent to those skilled in the art from the foregoing description and accompanying drawings. Such modifications are intended to fall within the scope of the appended claims.

What is claimed is:

1. A method for refueling a nuclear reactor core inside a reactor vessel, said core having a plurality of regions each comprised of a plurality of substantially horizontal layers, each layer being comprised of a plurality of individual fuel elements with the corresponding fuel elements in respective layers forming substantially vertical columns extending transversely of the layers, and wherein the fuel elements in at least the lowermost layer thereof are spent, said method comprising, refueling the regions in sequence by, for each region, removing from the pressure vessel unspent fuel elements in at least one but not all of said columns to expose at least one but not all of the spent fuel elements therein, removing from the pressure vessel the exposed spent fuel elements, moving within the pressure vessel unspent fuel elements to other locations including the former locations of at least some of the previously removed spent and unspent fuel elements to expose additional spent fuel elements, removing from the pressure vessel the exposed additional spent fuel elements, placing the unspent fuel elements which were previously removed from the pressure vessel at other locations in the core, placing new unspent fuel elements in the pressure vessel in at least the uppermost layer of fuel elements, and repeating this sequence for the other regions to complete refueling the core.

2. A method according to claim 1 wherein, after removal of the exposed additional spent fuel elements, unspent fuel elements are again moved within the pressure vessel to other locations including the former locations of at least some of the previously removed spent and unspent fuel elements.

3. A method according to claim 1 wherein removal and placement of the elements from and in the reactor core are performed in the region above the core.

4. A method according to claim 1 wherein the unspent fuel elements are removed from the pressure vessel from locations such that a portion of each of a plurality of layers are exposed.

5. A method according to claim 1 wherein the unspent fuel elements are moved within the pressure vessel from locations such that a portion of each of a plurality of layers is exposed.

6. A method according to claim 1 wherein each layer is comprised of seven elements.

7. A method according to claim 1 wherein the core region includes upper and lower layers of reflector elements, said upper layers of reflector elements being removed from the pressure vessel prior to removal of the spent fuel elements.

8. A method according to claim 1 wherein the core region includes three upper layers of reflector elements, eight layers of fuel elements, and a lower layer of reflector elements.

9. A method according to claim 8 wherein the lower two layers of fuel elements are removed as spent fuel elements.

* * * * *